United States Patent
Nakamura

(10) Patent No.: US 11,086,577 B2
(45) Date of Patent: Aug. 10, 2021

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Takashi Nakamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/551,788

(22) Filed: Aug. 27, 2019

(65) Prior Publication Data

US 2020/0301630 A1    Sep. 24, 2020

(30) Foreign Application Priority Data

Mar. 18, 2019   (JP) .............................. JP2019-049479

(51) Int. Cl.
*G06F 3/12*     (2006.01)
*G06F 21/60*    (2013.01)
*G06F 21/10*    (2013.01)

(52) U.S. Cl.
CPC .......... *G06F 3/1222* (2013.01); *G06F 3/1231* (2013.01); *G06F 3/1236* (2013.01); *G06F 3/1292* (2013.01); *G06F 21/105* (2013.01); *G06F 21/608* (2013.01)

(58) Field of Classification Search
CPC .... G06F 3/1222; G06F 3/1231; G06F 3/1236; G06F 3/1292; G06F 21/105; G06F 21/608
USPC .................................. 358/1.15, 1.9, 1.16, 504
See application file for complete search history.

(56) References Cited

U.S. PATENT DOCUMENTS

2011/0188079 A1\* 8/2011 Suzuki ...................... G06F 3/12
                                                      358/1.15
2020/0007348 A1\* 1/2020 Kakutani ............. H04N 1/4433

FOREIGN PATENT DOCUMENTS

JP        2004-320617 A    11/2004

\* cited by examiner

*Primary Examiner* — Quang N Vo
(74) *Attorney, Agent, or Firm* — Oliff PLC

(57) ABSTRACT

An information processing apparatus includes a transmitter, a receiver, and a registering unit. The transmitter is configured to, when a network to which the information processing apparatus is connected is changed, transmit identification information of a newly connected network to a management apparatus via a wireless communication line. The receiver is configured to receive setting information corresponding to the transmitted identification information from the management apparatus via the wireless communication line. The registering unit is configured to register the setting information received by the receiver as setting information of the information processing apparatus.

13 Claims, 15 Drawing Sheets

FIG.2

SETTING INFORMATION EXAMPLE 1

| NETWORK IDENTIFIER: NETWORK ID1 ||
|---|---|
| IF1 ||
| IP MODE | dual |
| IF TYPE | ETHERNET |
| SSID | — |
| DEFAULT GATEWAY ADDRESS | 192.168.10.1 |
| DNS SERVER | 146.212.33.101 |
| DHCP SERVER | 169.14.22.36 |
| IF2 ||
| IP MODE | IPv4 |
| IF TYPE | WiFi |
| SSID | abcd1234 |
| DEFAULT GATEWAY ADDRESS | 112.141.22.1 |
| DNS SERVER | 146.212.33.101 |
| DHCP SERVER | 169.14.22.36 |

| NETWORK IDENTIFIER: NETWORK ID2 ||
|---|---|
| IF1 ||
| IP MODE | IPv6 |
| IF TYPE | ETHERNET |
| SSID | — |
| DEFAULT GATEWAY ADDRESS | 111.33.29.1 |
| DNS SERVER | 158.201.22.12 |
| DHCP SERVER | 198.23.44.1 |

FIG.3

NETWORK IDENTIFIER RELATED LIST EXAMPLE

| MAIN IDENTIFIER | NETWORK ID1 |
|---|---|
| SUB-IDENTIFIER | NETWORK ID3 |

| MAIN IDENTIFIER | NETWORK ID2 |
|---|---|
| SUB-IDENTIFIER | NETWORK ID4 |
| | NETWORK ID5 |

FIG.10

(SECOND EXEMPLARY EMBODIMENT)

SETTING INFORMATION EXAMPLE 2

NETWORK IDENTIFIER: NETWORK ID1

| FUNCTION NAME | LICENSE KEY | NUMBER OF REGIS-TRATIONS | UPPER LIMIT NUMBER OF REGISTRA-TIONS |
|---|---|---|---|
| FUNCTION A | aaa0101 | 2 | 4 |
| FUNCTION B | bbb0101 | 3 | 5 |
| FUNCTION C | — | 0 | 0 |

NETWORK IDENTIFIER: NETWORK ID2

| FUNCTION NAME | LICENSE KEY | NUMBER OF REGIS-TRATIONS | UPPER LIMIT NUMBER OF REGISTRA-TIONS |
|---|---|---|---|
| FUNCTION A | — | 0 | 0 |
| FUNCTION B | bbb0102 | 2 | 6 |
| FUNCTION C | — | 0 | 0 |

FIG. 14

SETTING INFORMATION TRANSFER EXAMPLE (BEFORE TRANSFER)

NETWORK IDENTIFIER: NETWORK ID1

| FUNCTION NAME | LICENSE KEY | NUMBER OF REGIS-TRATIONS | UPPER LIMIT NUMBER OF REGISTRA-TIONS |
|---|---|---|---|
| FUNCTION A | aaa0101 | 2 | 4 |
| FUNCTION B | bbb0101 | 3 | 5 |
| FUNCTION C | — | 0 | 0 |

NETWORK IDENTIFIER: NETWORK ID2

| FUNCTION NAME | LICENSE KEY | NUMBER OF REGIS-TRATIONS | UPPER LIMIT NUMBER OF REGISTRA-TIONS |
|---|---|---|---|
| FUNCTION A | — | 0 | 0 |
| FUNCTION B | — | 0 | 0 |
| FUNCTION C | — | 0 | 0 |

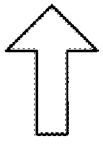

(AFTER TRANSFER)

NETWORK IDENTIFIER: NETWORK ID1

| FUNCTION NAME | LICENSE KEY | NUMBER OF REGIS-TRATIONS | UPPER LIMIT NUMBER OF REGISTRA-TIONS |
|---|---|---|---|
| FUNCTION A | aaa0101 | 2 | 4 |
| FUNCTION B | bbb0101 | 2 | 3 |
| FUNCTION C | — | 0 | 0 |

NETWORK IDENTIFIER: NETWORK ID2

| FUNCTION NAME | LICENSE KEY | NUMBER OF REGIS-TRATIONS | UPPER LIMIT NUMBER OF REGISTRA-TIONS |
|---|---|---|---|
| FUNCTION A | — | 0 | 0 |
| FUNCTION B | bbb0101 | 1 | 2 |
| FUNCTION C | — | 0 | 0 |

FIG. 15

(THIRD EXEMPLARY EMBODIMENT)

SETTING INFORMATION EXAMPLE 3

| NETWORK IDENTIFIER: NETWORK ID1 | |
|---|---|
| SCAN RESOLUTION | 200dpi |
| CONVERSION FORMAT AT SCANNING | PDF |
| COLOR MODE AT COPYING | MONOCHROME |
| IMAGE QUALITY ADJUSTMENT AT COPYING | CHARACTER |
| ... | ... |

| NETWORK IDENTIFIER: NETWORK ID2 | |
|---|---|
| SCAN RESOLUTION | 300dpi |
| CONVERSION FORMAT AT SCANNING | JPEG |
| COLOR MODE AT COPYING | MONOCHROME |
| IMAGE QUALITY ADJUSTMENT AT COPYING | PHOTOGRAPH |
| ... | ... |

| NETWORK IDENTIFIER: NETWORK ID3 | |
|---|---|
| SCAN RESOLUTION | 400dpi |
| CONVERSION FORMAT AT SCANNING | PDF |
| COLOR MODE AT COPYING | COLOR |
| IMAGE QUALITY ADJUSTMENT AT COPYING | CHARACTER/PHOTOGRAPH |
| ... | ... | ns
INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-049479 filed Mar. 18, 2019.

BACKGROUND

(i) Technical Field

The present invention relates to an information processing apparatus, an information processing system, and a non-transitory computer readable medium.

(ii) Related Art

JP-A-2004-320617 discloses a system which enables an appropriate information access from an information terminal according to a positional situation by performing a dynamic access permission/prohibition determination based on access position information in addition to authentication of an ID, a password, and the like of an owner of a terminal.

SUMMARY

Aspects of non-limiting embodiments of the present disclosure relate to an information processing apparatus, an information processing system, and a non-transitory computer readable medium that are capable of registering settings corresponding to a newly connected network without requiring a user's operation even when an already-connected network is changed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a transmitter configured to, when a network to which the information processing apparatus is connected is changed, transmit identification information of a newly connected network to a management apparatus via a wireless communication line; a receiver configured to receive setting information corresponding to the transmitted identification information from the management apparatus via the wireless communication line; and a registering unit configured to register the setting information received by the receiver as setting information of the information processing apparatus.

BRIEF DESCRIPTION OF THE DRAWINGS

Exemplary embodiment(s) of the present disclosure will be described in detail based on the following figures, wherein:

FIG. 2 is a view illustrating an example of setting information stored in a management server 60;

FIG. 3 is a view illustrating an example of a network identifier related list stored in the management server 60;

FIG. 10 is a view illustrating an example of setting information stored in a management server 60 in an information processing system according to a second exemplary embodiment of the present invention;

FIG. 14 is a view illustrating a change in setting information when use authority is transferred from the base A to the base B; and FIG. 15 is a view illustrating an example of setting information stored in a management server 60 in an information processing system according to a third exemplary embodiment of the present invention.

DETAILED DESCRIPTION

Hereinafter, exemplary embodiments of the present invention will be described with reference to the accompanying drawings.

First Exemplary Embodiment

Figure 1:
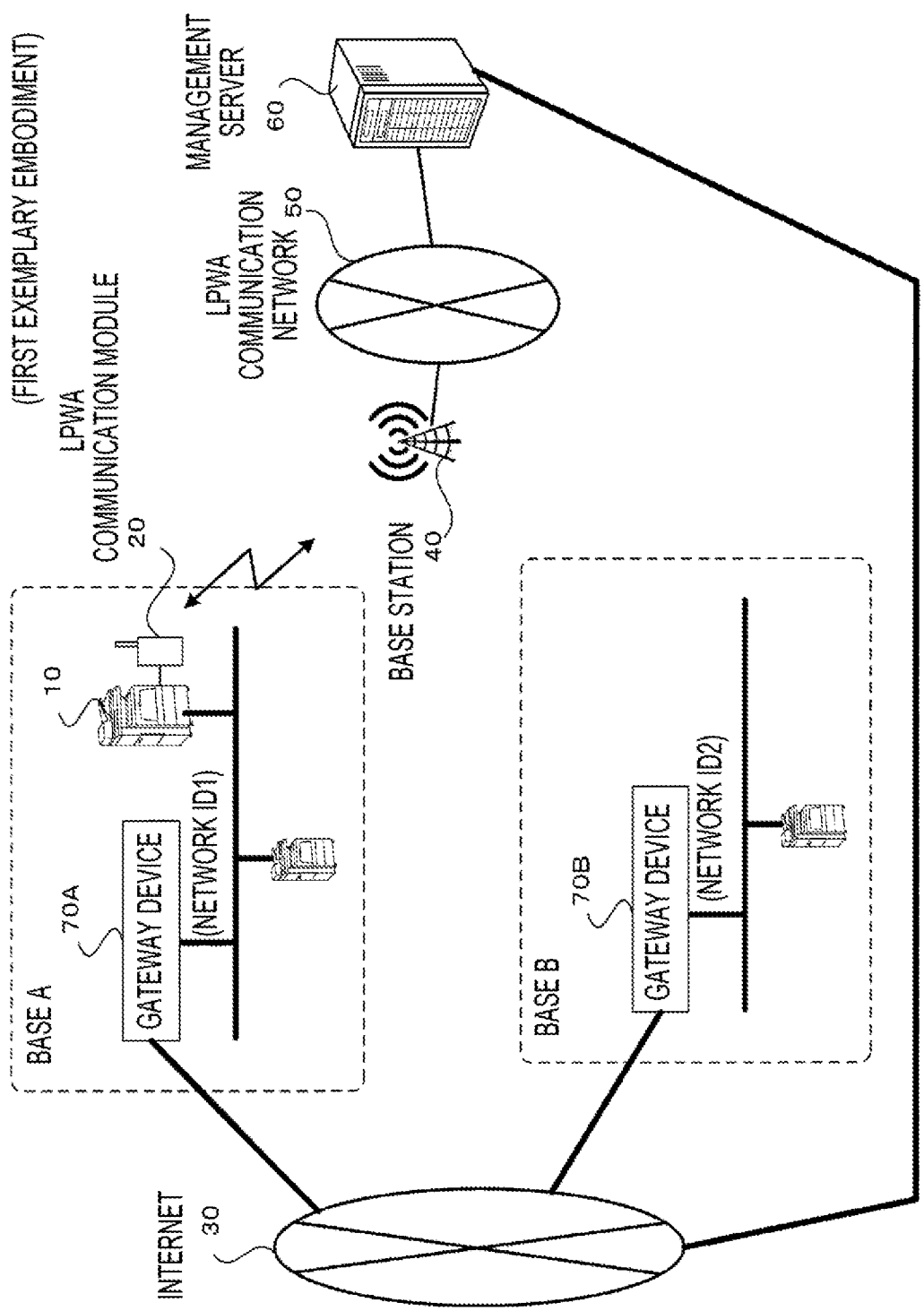
FIG. 1 is a view illustrating a system configuration of an information processing system according to a first exemplary embodiment of the present invention.

FIG. 1 illustrates a system configuration of an information processing system according to a first exemplary embodiment of the present invention.

The information processing system according to the present exemplary embodiment includes an image forming apparatus 10, a low power wide area (LPWA) communication module 20 connected to the image forming apparatus 10, and a management server 60 that stores management information for managing setting information of plural image forming apparatuses including the image forming apparatus 10, which are connected via a base station 40 and an LPWA communication network 50.

In the information processing system according to the present exemplary embodiment, an in-house network is configured for each of the bases A and B of a certain company, and each in-house network is connected to the Internet 30 by gateway devices 70A and 70B.

The image forming apparatus 10 specifies a network to which the image forming apparatus is connected, using a network identifier which is network identification information.

Here, the network identifier is information that may uniquely specify a network environment. Any information that may uniquely specify the network environment may be used as the network identifier. In the present exemplary embodiment, a case of using a Media Access Control (MAC) address of a gateway device will be described as an example of the network identifier. For example, an MAC address "9C:AE:D3:D7:AE:36" of the gateway device 70A is used as a network ID1, and an MAC address "AC:36:43:CA:AE:25" of the gateway device 70B is used as a network ID2. In the following description, these addresses are simply expressed as a "network ID1" and a "network ID2", respectively.

In FIG. 1, in the information processing system according to the present exemplary embodiment, only the image forming apparatus 10 is described with a reference numeral, but image forming apparatuses other than the image forming apparatus 10 are connected in the respective network of the bases A and B.

The management server 60 is a management apparatus that stores a network identifier and setting information to be set by an image forming apparatus connected to a network in association with each other.

FIG. 2 illustrates an example of the setting information stored in the management server 60.

The setting information example illustrated in FIG. 2 is connection setting information for connecting the Internet 30 which is an external network.

Further, in the example of the setting information illustrated in FIG. 2, for each of network identifiers such as the network ID1 and the network ID2, an Internet Protocol (IP) mode, an Interface (IF) type such as Ethernet (registered trademark) or WiFi (registered trademark), a Service Set Identifier (SSID), a default gateway address, an address of a Domain Name System (DNS) server, an address of a Dynamic Host Configuration Protocol (DHCP) server, and the like are associated with each other. In FIG. 2, in the network ID1, two pieces of connection setting information IF1 and IF2 are associated with each other.

Instead of associating different setting information with network identifiers, respectively, the same setting information may be stored in association with plural network identifiers that are associated in advance.

For example, a network identifier related list illustrated in FIG. 3 is stored in the management server 60. The network identifier related list is a list indicating a group of network identifiers associated with the same setting information. Specifically, a network ID4 and a network ID5 are sub-identifiers, and a network ID2 is a main identifier. Therefore, the network ID4 and the network ID5 are handled in the same manner as the setting information associated with the network ID2 is associated.

By setting the connection setting information illustrated in FIG. 2 in the image forming apparatus 10, the image forming apparatus 10 may be connected to the Internet 30.

Figure 4:
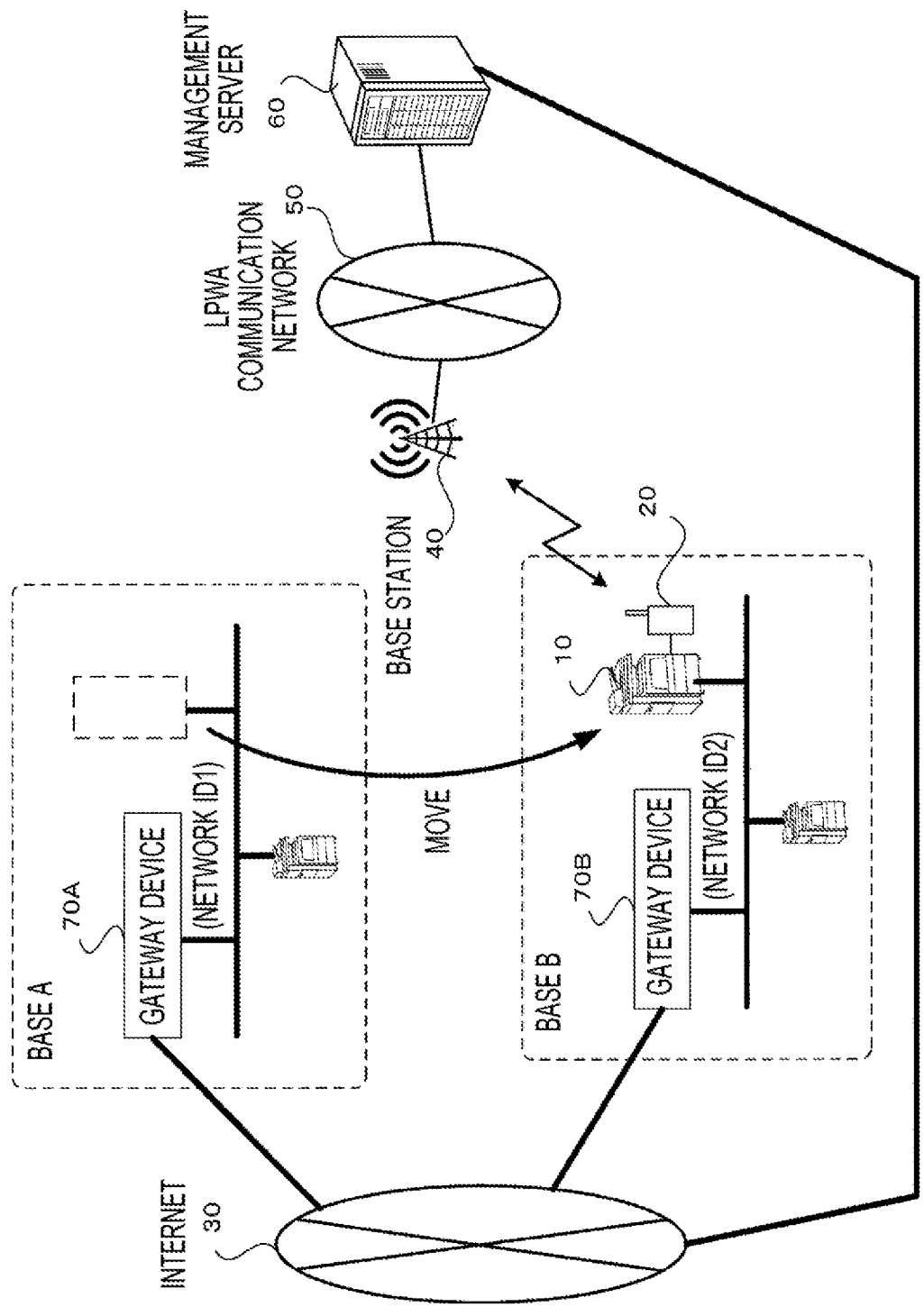
FIG. 4 is a view illustrating a state in which an image forming apparatus 10 is moved from a base A to a base B and is connected to a network of the base B.

However, for example, as illustrated in FIG. 4, when the image forming apparatus 10 is moved from the base A to the base B and is newly connected to the network of the base B, and when the image forming apparatus 10 connects to the management server 60 only via the Internet 30, the connection setting information may not be acquired from the management server 60 in the first place.

Further, in recent years, the image forming apparatus 10 may not connect to the management server 60 because a network on which the image forming apparatus 10 is installed is disconnected from the Internet or a firewall is installed on the way to the management server 60 from the viewpoint of security.

In such a case, when the image forming apparatus 10 is connected to a new network, it is necessary to perform various settings of the image forming apparatus 10 by a user's operation.

Therefore, in the information processing system of the present exemplary embodiment, the image forming apparatus 10 is configured to connect the management server 60 via the LPWA, which is a power saving wide area wireless communication line, to acquire setting information corresponding to the newly connected network.

The LPWA is also called a low power wide area network (LPWAN) and is a wireless communication line that may not perform a high-speed communication but may transmit and receive data in a wide area with low power consumption.

The LPWA is also a wireless communication line that allows connection to the management server 60 without a need for network setting. The LPWA is also a wireless communication line provided by a wide area wireless communication network in which data is transmitted and received at a lower communication speed than the communication speed on the Internet 30 which is an external network.

In recent years, a commercial service of the LPWA wireless communication line has been provided and may be used at a lower communication charge than the line contract of a mobile telephone line network.

Figure 5:
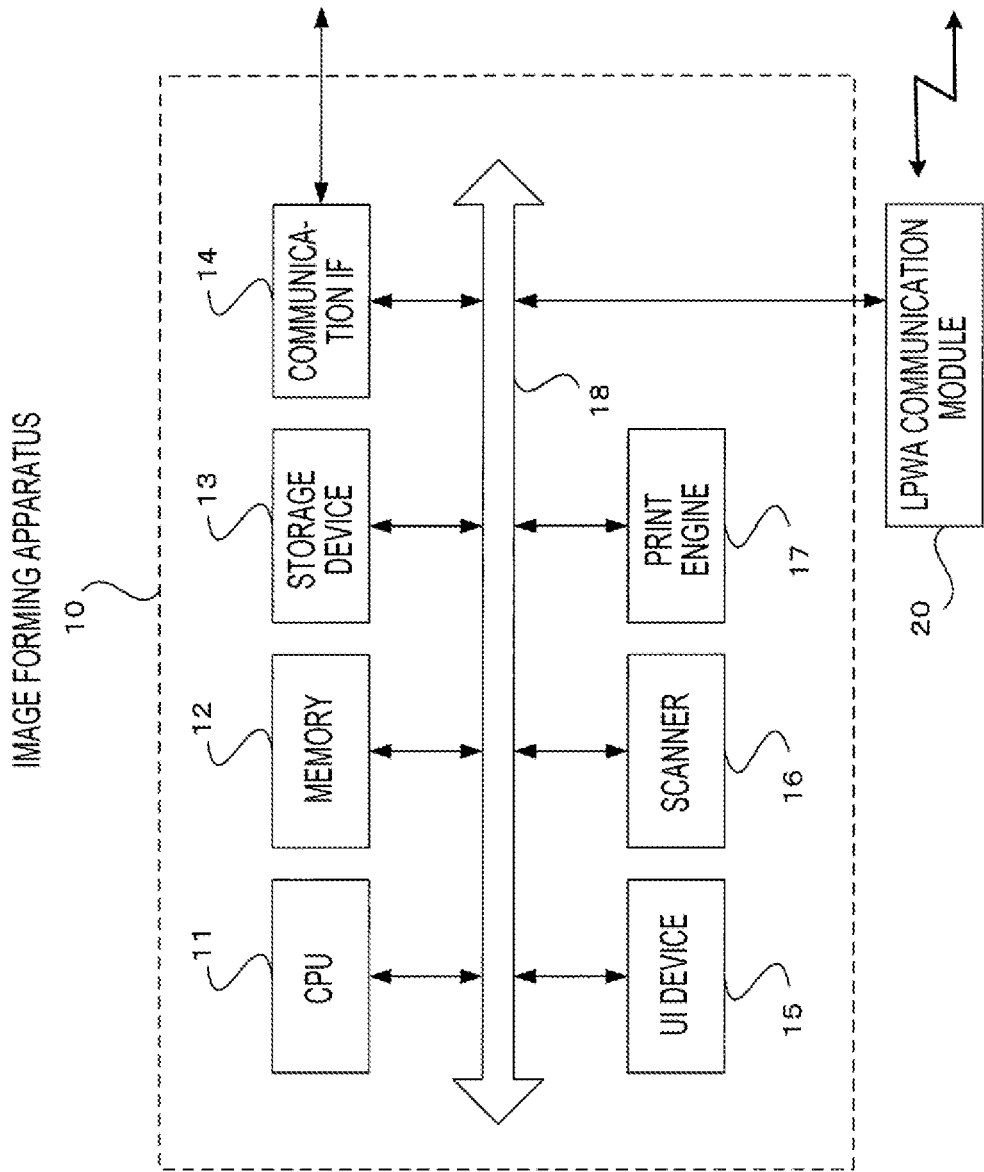
FIG. 5 is a block diagram illustrating a hardware configuration of the image forming apparatus 10 illustrated in FIG. 1.

Next, the hardware configuration of the image forming apparatus 10 illustrated in FIG. 1 is illustrated in the block diagram of FIG. 5.

As illustrated in FIG. 5, the image forming apparatus 10 includes a CPU 11, a memory 12, a storage device 13 such as a hard disk drive (HDD), a communication interface (IF) 14 that exchanges data with another image forming apparatus 10 via a network 30, a user interface (UI) 15 that includes a touch panel or a liquid crystal display and a keyboard, a scanner 16, and a print engine 17. These components are interconnected via a control bus 18. An LPWA communication module 20 is also connected to the above-mentioned components via the control bus 18.

The CPU 11 executes a predetermined process based on a control program stored in the memory 12 or the storage device 13 to control the operation of the image forming apparatus 10. In the present exemplary embodiment, although the CPU 11 is described as reading and executing the control program stored in the memory 12 or the storage device 13, the control program may be stored in a storage medium such as a CD-ROM and may be provided to the CPU 11.

Figure 6:
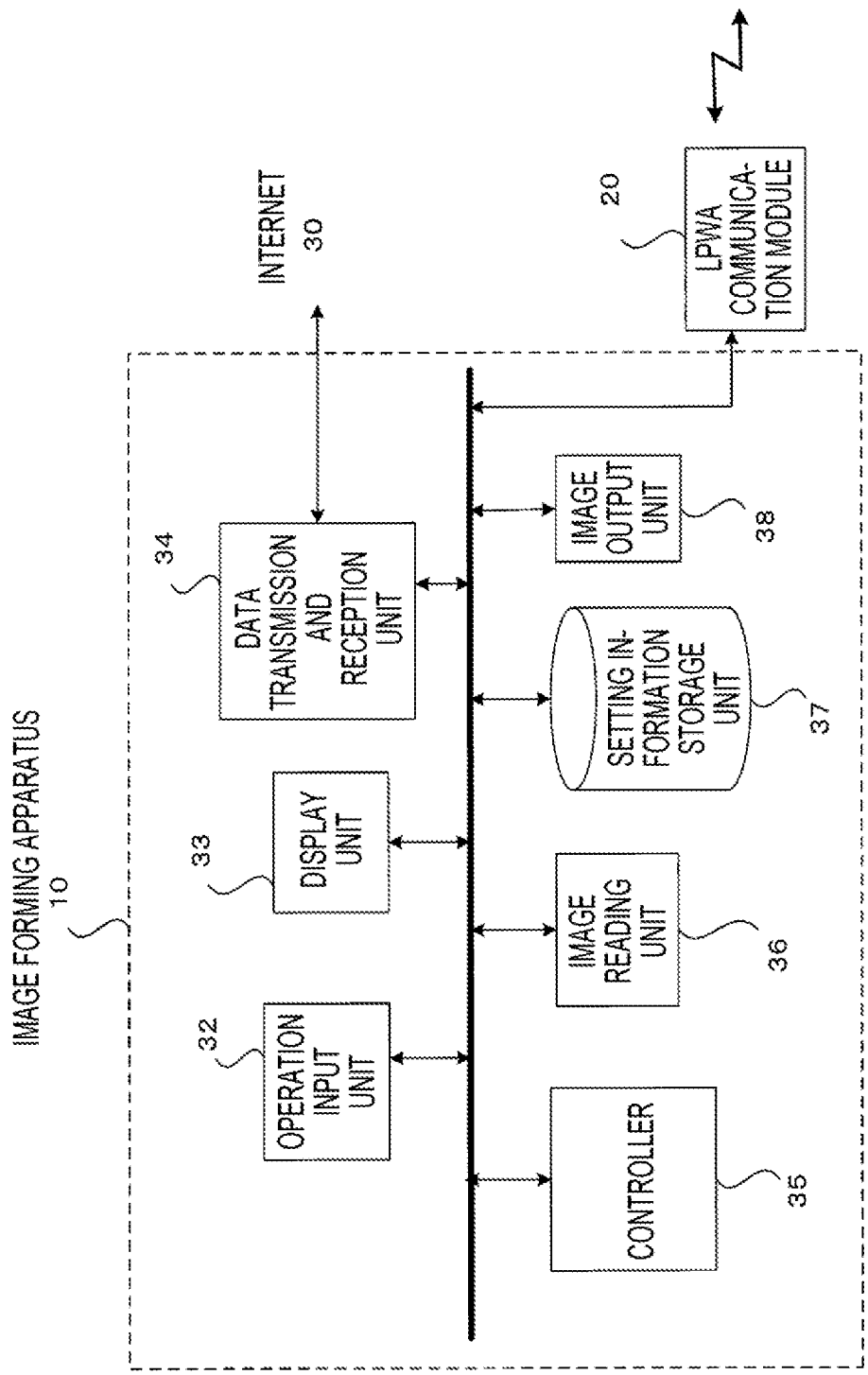
FIG. 6 is a block diagram illustrating a functional configuration of the image forming apparatus 10 illustrated in FIG. 1.

FIG. 6 is a block diagram illustrating a functional configuration of the image forming apparatus 10 implemented by executing the above-described control program.

As illustrated in FIG. 5, the image forming apparatus 10 according to the present exemplary embodiment includes an operation input unit 32, a display unit 33, a data transmission and reception unit 34, a controller 35, an image reading unit 36, a setting information storage unit 37, and an image output unit 38.

The operation input unit 32 inputs various operations by a user. The display unit 33 displays various types of information to the user.

The image reading unit 36 reads an image from a set document. The image output unit 38 outputs an image on a recording medium such as printing paper.

The data transmission and reception unit 34 transmits and receives data to and from an external device via the Internet 30.

The setting information storage unit 37 stores setting information for performing various settings of its own apparatus. Specifically, the setting information storage unit 37 stores, as setting information, connection setting information for connecting to the Internet 30 which is the external network as described above.

Further, the setting information storage unit 37 stores setting information for setting an option function (or an extension function or an addition function) to enable or disable and setting information for setting set contents that are determined in advance in a connected network environment in the apparatus.

When a network to which its own apparatus is connected is changed, the controller 35 transmits an identifier of the newly connected network to the management server 60 via the LPWA through the LPWA communication module 20.

Further, the controller 35 receives setting information corresponding to the transmitted network identifier from the management server 60 via the LPWA, and overwrites and registers the received setting information in the setting information storage unit 37 as setting information of its own apparatus. That is, the controller 35 updates the setting information stored in the setting information storage unit 37 with the setting information received from the management server 60 via the LPWA communication module 20.

Figure 7:
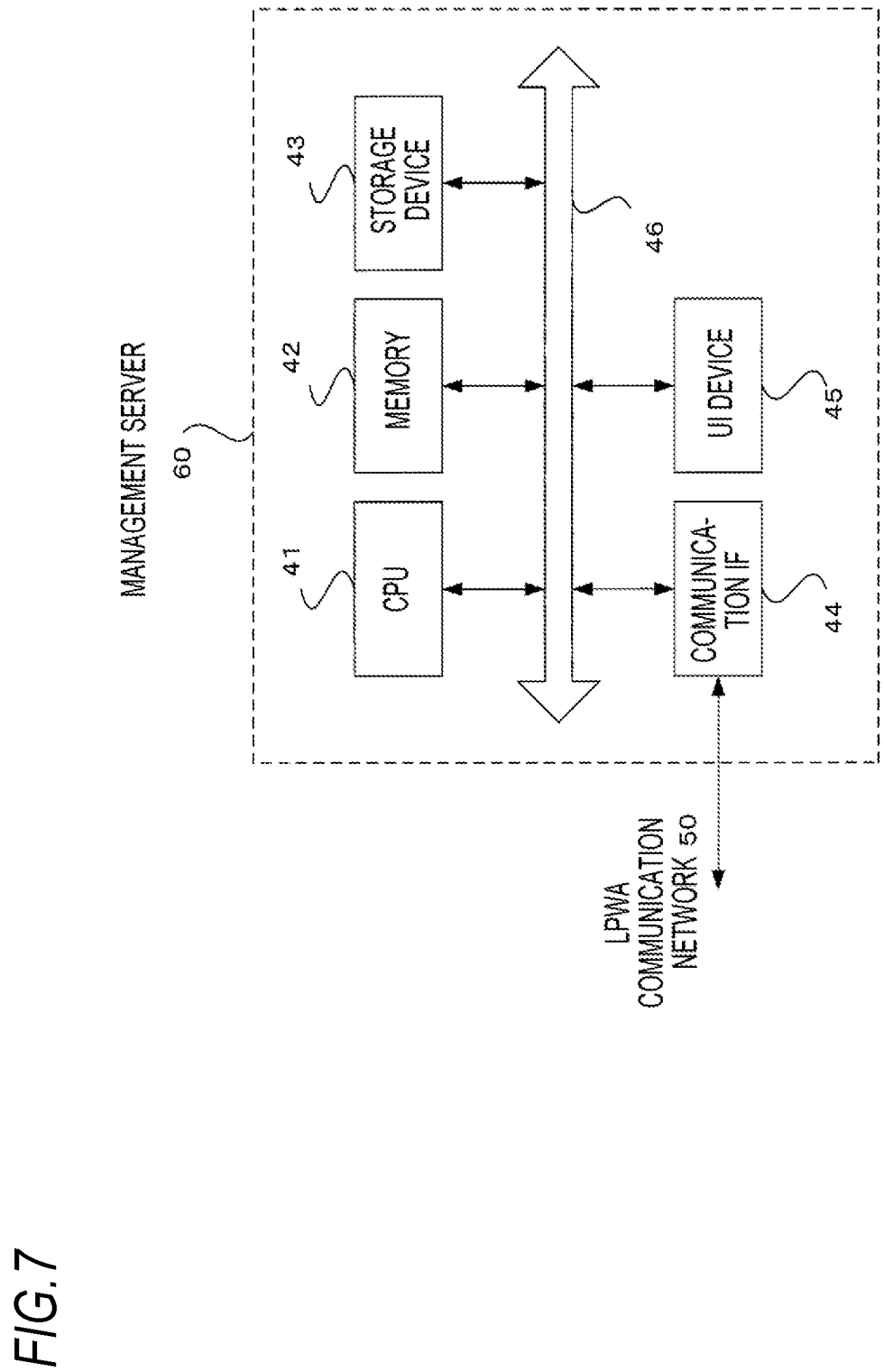
FIG. 7 is a view illustrating a hardware configuration of the management server 60 illustrated in FIG. 1.

Next, the hardware configuration of the management server 60 illustrated in FIG. 1 is illustrated in FIG. 7.

As illustrated in FIG. 7, the management server 60 includes a CPU 41, a memory 42, a storage device 43 such as a hard disk drive (HDD), a communication interface (IF) 44 that exchanges data with the image forming apparatus 10 via an LPWA communication network 50, and a user interface (UI) device 45 that includes a touch panel or a liquid crystal display and a keyboard. These components are interconnected via a control bus 46.

The CPU 41 executes a predetermined process based on a control program stored in the memory 42 or the storage device 43 to control the operation of the management server 60. In the present exemplary embodiment, although the CPU 41 is described as reading and executing the control program stored in the memory 42 or the storage device 43, the control program may be stored in a storage medium such as a CD-ROM and may be provided to the CPU 41.

Figure 8:
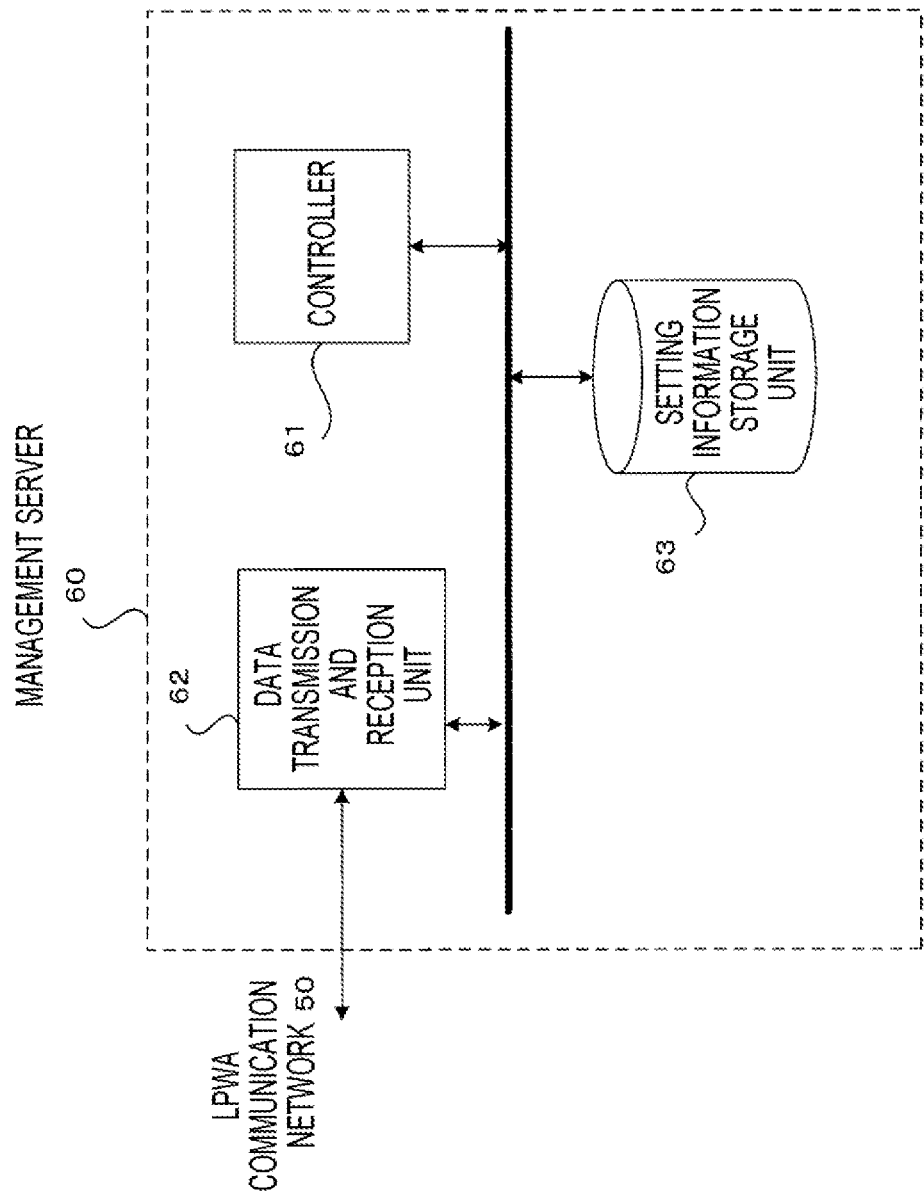
FIG. 8 is a block diagram illustrating a functional configuration of the management server 60 illustrated in FIG. 1.

FIG. 8 is a block diagram illustrating a functional configuration of the management server 60 implemented by executing the above-described control program.

As illustrated in FIG. 8, the management server 60 includes a controller 61, a data transmission and reception unit 62, and a setting information storage unit 63.

The setting information storage unit 63 stores the setting information as illustrated in FIG. 2 in association with a network identifier.

When the data transmission and reception unit 62 receives a network identifier from the image forming apparatus 10 via the LPWA communication network 50, the controller 61 reads out setting information corresponding to the received network identifier from the setting information storage unit 63, and transmits the read setting information to the image forming apparatus 10 that has transmitted the network identifier, via the LPWA communication network 50.

Next, the operation of the image forming apparatus 10 of the present exemplary embodiment will be described in detail with reference to the drawings.

Figure 9:
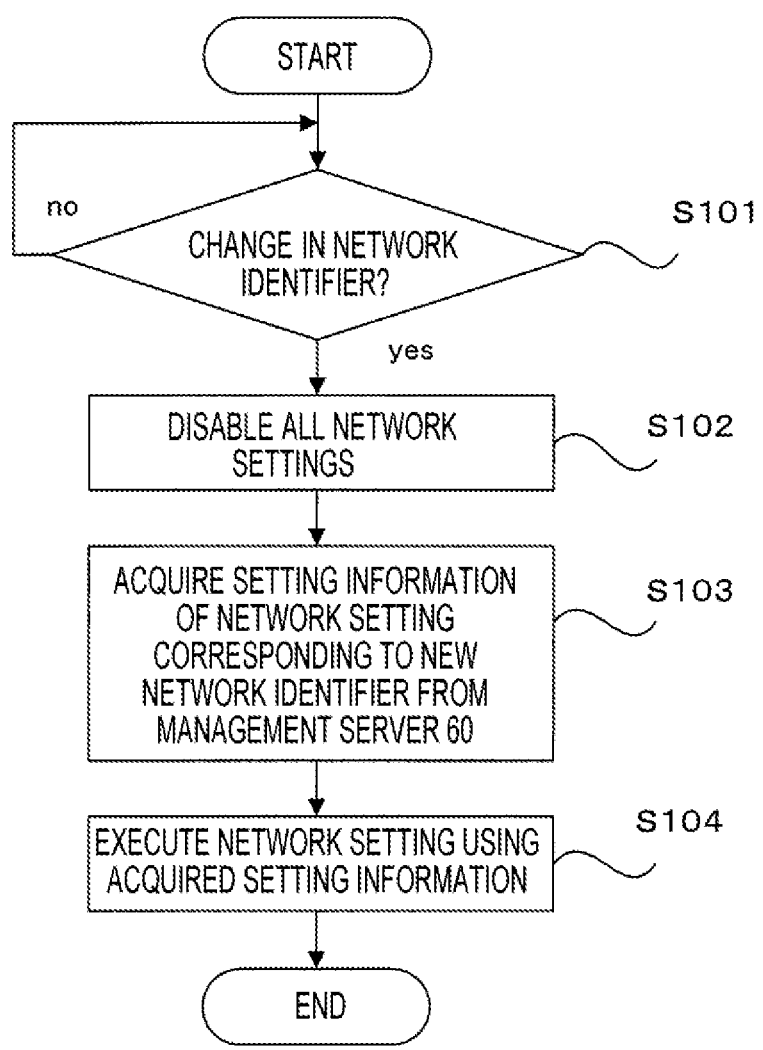
FIG. 9 is a flowchart of an operation when the image forming apparatus 10 according to the first exemplary embodiment of the present invention is moved from the base A to the base B and is connected to the network of the base B.

For example, with reference to the flowchart of FIG. 9, descriptions will be made on the operation when the image forming apparatus 10 is moved from the base A to the base B and is connected to the network of the base B as illustrated in FIG. 4.

In the image forming apparatus 10, when the image forming apparatus 10 is newly connected to the network of the base B, the network identifier is changed from the network ID1 to the network ID2.

Then, the controller 35 detects a change in the network identifier in step S101, and disables all network settings in step S102.

Then, in step S103, the controller 35 transmits the network ID2, which is the new network identifier, from the LPWA communication module 20 to the management server 60, and acquires network setting information associated with the network ID2.

Thereafter, the controller 35 performs a network setting using the acquired network setting information, thereby the image forming apparatus 10 may connect to the Internet 30 from the network of the base B.

Second Exemplary Embodiment

Next, an information processing system according to a second exemplary embodiment of the present invention will be described.

Since the information processing system of the second exemplary embodiment has the same configuration as that of the first exemplary embodiment described above, the reference numerals in the first exemplary embodiment are used as they are to describe the second exemplary embodiment.

In the first exemplary embodiment, the network connection setting is performed using the setting information acquired from the management server 60 when the connected network is changed. However, in the second exemplary embodiment, descriptions will be made on a case where setting is performed to enable or disable an option function when the connected network is changed.

First, an example of setting information stored in the management server 60 in the information processing system of the second exemplary embodiment is illustrated in FIG. 10.

The number of registrations for each of functions A, B, and C, the upper limit number of registrations for each of functions A, B, and C, and license key information for enabling each function are set in the setting information illustrated in FIG. 10 in association with the network identifier.

Here, the upper limit number of registrations refers to the upper limit number of apparatuses permitted to enable the function in the network environment specified by the network identifier. The number of registrations refers to the number of apparatuses that have the functions currently enabled.

In the image forming apparatus 10, by acquiring license key information for enabling a certain option function from the management server 60 as setting information, the function may be enabled in its own apparatus.

Referring to the setting information illustrated in FIG. 10, it may be seen that a function A and a function B are available at the base A where the network identifier is the network ID1, and only the function B is available at the base B where the network identifier is the network ID2.

That is, when the image forming apparatus 10 in which the function A is in the enable state at the base A is moved to the base B, and when the function A is used in the enable state, there may arises an issue in terms of license agreement.

Therefore, in the image forming apparatus 10 of the second exemplary embodiment, when the network to which its own apparatus is connected is changed, the controller 35 changes the enabled option function to disable.

Then, in the management server 60, the controller 61 stores in advance, for each network identifier, the upper limit number of apparatuses that are permitted to enable each option function as the upper limit number of registrations. The controller 61 issues license key information to the image forming apparatus 10 within a range that does not exceed the upper limit number of registrations. Meanwhile, the controller 61 adds 1 to the current number of registrations by newly issuing a license key.

Next, the operation of the image forming apparatus 10 of the present exemplary embodiment will be described in detail with reference to the drawings.

Figure 11:
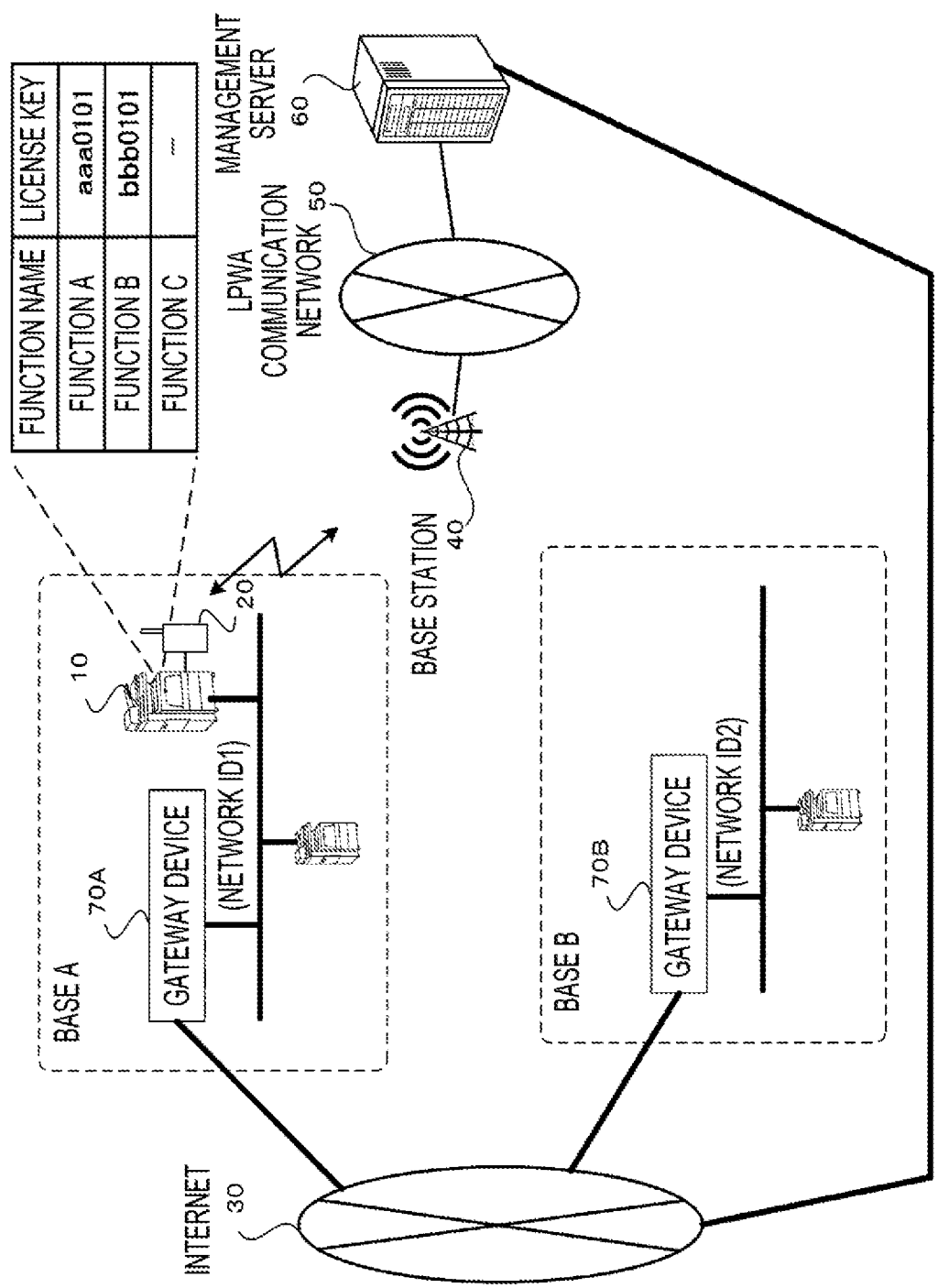
FIG. 11 is a view illustrating setting information stored when the image forming apparatus 10 is connected to a network of the base A.

First, setting information stored when the image forming apparatus 10 is connected to the network of the base A is illustrated in FIG. 11. In FIG. 11, setting is performed such that the function A and the function B are enabled for the image forming apparatus 10, and a license key "aaa0101" for enabling the function A and a license key "bbb0101" for enabling the function B are stored as setting information.

Then, a state when the image forming apparatus 10 is moved to the base B and is connected to the network of the base B will be described with reference to FIG. 12.

When the network identifier is changed as the image forming apparatus 10 is connected to the base B, the controller 35 disabled all the enabled functions, that is, the function A and the function B. Then, the controller 35 acquires a license key "bbb0102" associated with the network ID2 from the management server 60, and enables the function B again.

Figure 12:
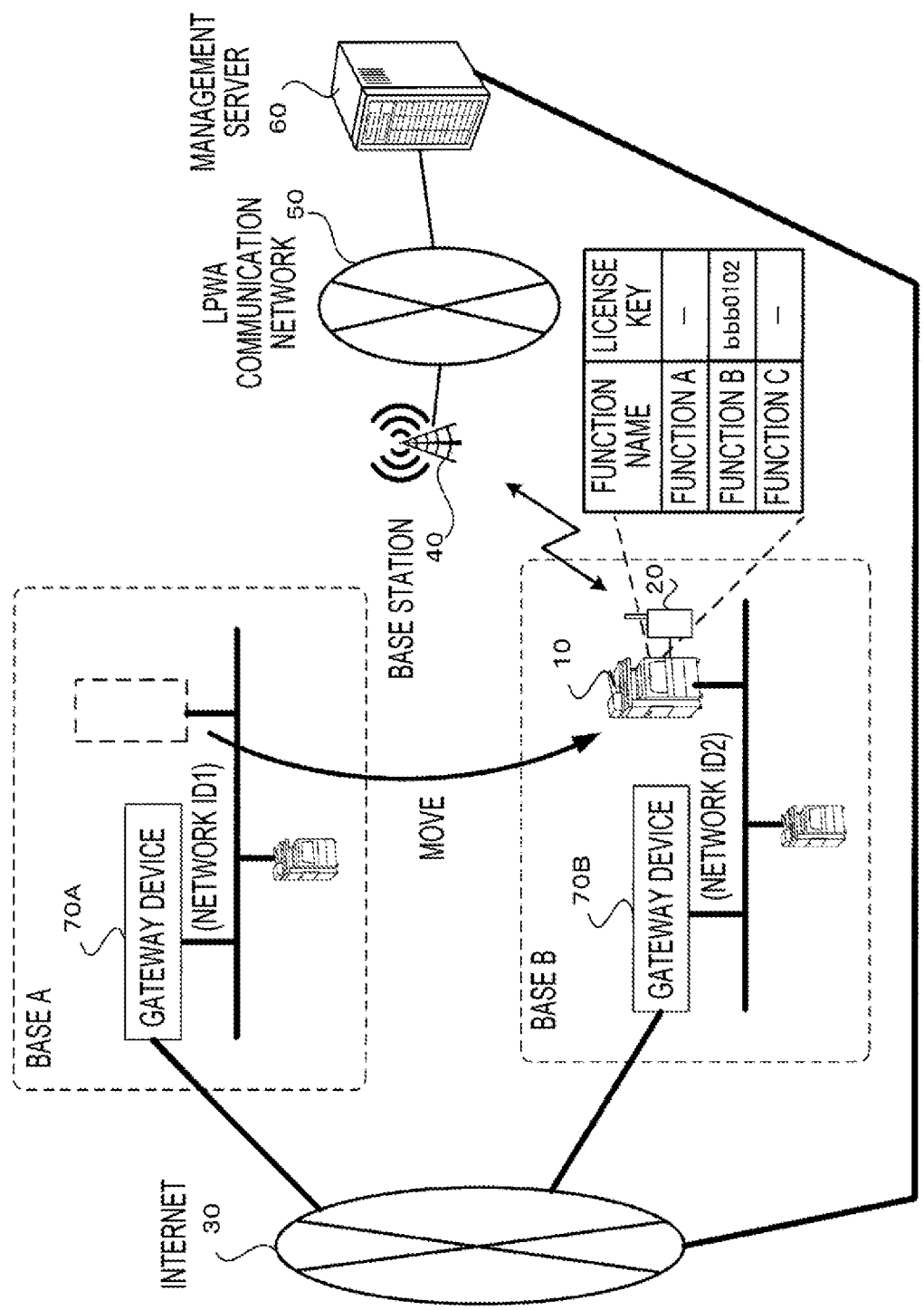
FIG. 12 is a view illustrating a state when the image forming apparatus 10 is moved to the base B and is connected to the network of the base B.
Figure 13:
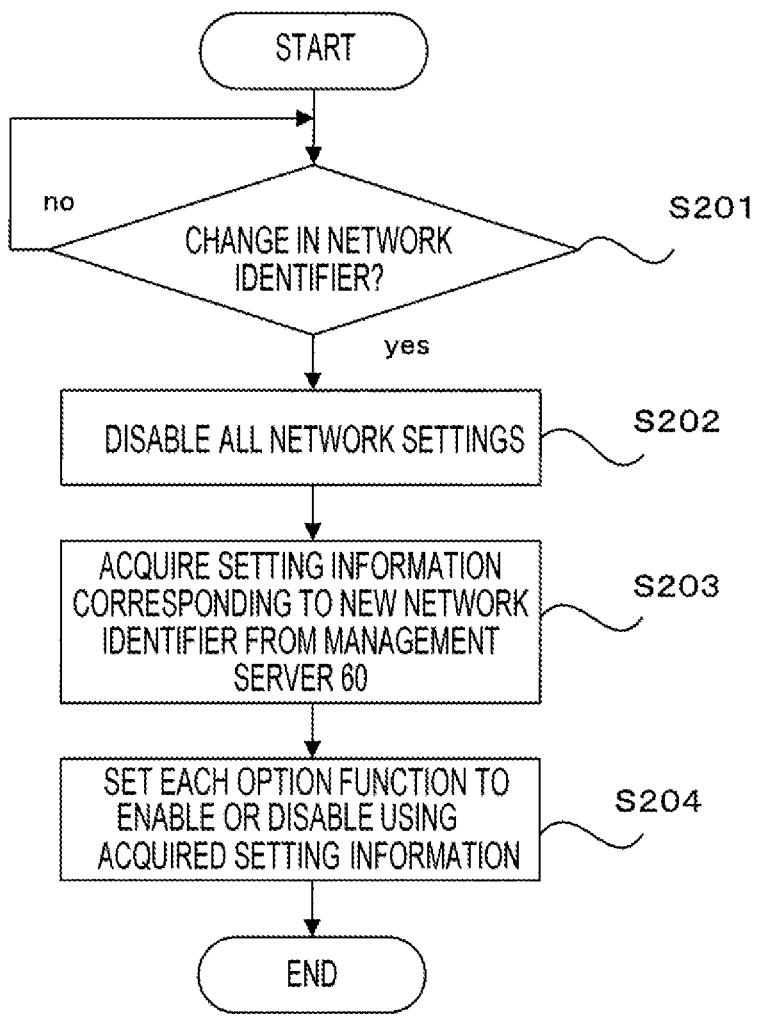
FIG. 13 is a flowchart of an operation when the image forming apparatus 10 according to the second exemplary embodiment of the present invention is moved from the base A to the base B and is connected to the network of the base B.

Next, with reference to the flowchart in FIG. 13, descriptions will be made on the operation in a case where the image forming apparatus 10 is moved from the base A to the base B and is connected to the network of the base B as illustrated in FIGS. 11 and 12.

In the image forming apparatus 10, when the image forming apparatus 10 is newly connected to the network of the base B, the network identifier is changed from the network ID1 to the network ID2.

Then, the controller 35 detects a change in the network identifier in step S201, and disables all the option functions in step S202.

Then, in step S203, the controller 35 transmits the network ID2, which is the new network identifier, from the LPWA communication module 20 to the management server 60, and acquires license key information associated with the network ID2 as setting information.

Thereafter, the controller 35 sets each option function to enable or disable using the acquired license key information, thereby the image forming apparatus 10 may utilize the option function permitted at the base B.

In the meantime, as described above, the function A and the function B are available at the base A, and only the function B is available at the base B. However, there may be a case where all the functions A to C may not be used at the base B and no setting information associated with the network ID2 exists in the management server 60.

In such a case, only a part of the authority to use the option function permitted at the base A may be transferred to the base B by a user operation or the like.

Specifically, as illustrated in FIG. 14, by transferring a part of the use authority of the function B for which the upper limit number of registrations is 5 at the base A before transfer of the use authority at the base B, the upper limit number of registrations becomes 3 at the base A and 2 at the base B, from which it may be seen that the transfer of the use authority is performed without changing the total upper limit number of registrations.

By performing such transfer of the use authority, even when the image forming apparatus 10 is moved from the base A to the base B in a state where the use of the function B is not permitted at the base B, the image forming apparatus 10 may use the function B.

Third Exemplary Embodiment

Next, an information processing system according to a third exemplary embodiment of the present invention will be described.

Since the information processing system of the third exemplary embodiment has the same configuration as that of the first exemplary embodiment described above, the reference numerals in the first exemplary embodiment are used as they are to describe the second exemplary embodiment.

In the first exemplary embodiment, the network connection setting is performed using the setting information acquired from the management server 60 when the connected network is changed. However, in the third exemplary embodiment, descriptions will be made on a case where various settings in the network environment are automatically performed when the connected network is changed.

First, an example of setting information stored in the management server 60 in the information processing system of the third exemplary embodiment is illustrated in FIG. 15.

Information of various setting parameters such as a scan resolution, a conversion format at scanning, a color mode at copying, and an image quality adjustment at copying is set for each network identifier in the setting information illustrated in FIG. 15.

According to the third exemplary embodiment, for example, when the image forming apparatus 10 is moved from the base A to the base B and is connected to the network of the base B, various setting parameters required to be set when the image forming apparatus 10 is used at the base B are automatically registered and set.

Modifications

It has been illustrated in the first to third exemplary embodiments that, when the network to which the image forming apparatus is connected is changed, the setting information corresponding to the newly connected network is acquired from the management server. However, the present invention is not limited thereto but may be equally applied even to a case where the setting information corresponding to a network to which an information processing apparatus other than the image forming apparatus is newly connected is acquired from the management server.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   determine that a network to which the information processing apparatus is connected has changed;
   a transmitter configured to, as a result of the information processing apparatus determining that the network to which the information processing apparatus is connected is changed, transmit identification information of a newly connected network to a management apparatus via a wireless communication line;
   a receiver configured to receive setting information corresponding to the transmitted identification information from the management apparatus via the wireless communication line; and
   a registering unit configured to register the setting information received by the receiver as setting information of the information processing apparatus.

2. The information processing apparatus according to claim 1, wherein the setting information comprises connection setting information for connecting to an external network.

3. The information processing apparatus according to claim 1, wherein the setting information comprises setting information for setting an option function to enable or disable.

4. The information processing apparatus according to claim 3, further comprising:
   a changing unit configured to, when the network to which the information processing apparatus is connected is changed, change enabled option function to disable.

5. The information processing apparatus according to claim 3, wherein the setting information comprises license key information for enabling the option function.

6. The information processing apparatus according to claim 4, wherein the setting information comprises license key information for enabling the option function.

7. The information processing apparatus according to claim 1, wherein the setting information is setting information for setting set contents that are determined in advance in a connected network environment in the information processing apparatus.

8. The information processing apparatus according to claim 2, wherein the wireless communication line is a wireless communication line that allows connection to the management apparatus without a need for network setting.

9. The information processing apparatus according to claim 8, wherein the wireless communication line is a wireless communication line provided by a wide area wireless communication network in which data is transmitted and received at a communication speed lower than a communication speed in the external network.

10. An information processing system comprising:
    a management apparatus; and
    an information processing apparatus, wherein
    the management apparatus is configured to store
       identification information of a network, and
       setting information to be set by the information processing apparatus connected to the network in association with each other, and
    the information processing apparatus is configured to:
       determine that the network to which the information processing apparatus is connected is changed,
       as a result of determining that the network has changed, transmit identification information of a newly connected network to the management apparatus via a wireless line,
       receive setting information corresponding to the transmitted identification information from the management apparatus, and
       register the received setting information as setting information of the information processing apparatus.

11. The information processing system according to claim 10, wherein the management apparatus stores the same setting information in association with plural pieces of identification information that are associated in advance.

12. The information processing system according to claim 10, wherein
    the setting information comprises license key information for enabling option functions in the information processing apparatus,
    the management apparatus stores in advance the upper limit number of apparatuses that are permitted to enable each option function for each identification information of the network, and
    the management apparatus issues the license key information to the information processing apparatus within a range that does not exceed the upper limit number of apparatuses.

13. A non-transitory computer readable medium storing a program that causes a computer to execute information processing, the information processing comprising:
    determine that a network to which the computer is connected has changed;
    as a result of determining that the network to which the computer is connected is changed, transmit identification information of a newly connected network to a management apparatus via a wireless communication line;
    receive setting information corresponding to the transmitted identification information from the management apparatus via the wireless communication line; and
    register the received setting information as setting information of the computer.

* * * * *